March 12, 1946.  O. RASMUSSEN  2,396,387

BRAKE

Filed Sept. 23, 1944

INVENTOR
Olaf Rasmussen
BY
Blackmor Spencer + Hunt
ATTORNEYS

Patented Mar. 12, 1946

2,396,387

UNITED STATES PATENT OFFICE 2,396,387

BRAKE

Olaf Rasmussen, Dayton, Ohio, assignor to General Motors Corporation, Detroit, Mich., a corporation of Delaware Application September 23, 1944, Serial No. 555,485

5 Claims. (Cl. 188—78)

A novel brake shoe assembly for vehicles is the subject matter of this invention.

A major object is to provide an assembly of shoes in which a complete servo action is present for both forward and rearward vehicle travel.

A further object is to make sure that the arcuate surfaces of each of the shoes fits the drum during braking.

Other objects including simplicity in construction and a comparatively inexpensive manufacturing cost as will be understood from the description which follows.

Figure 1:
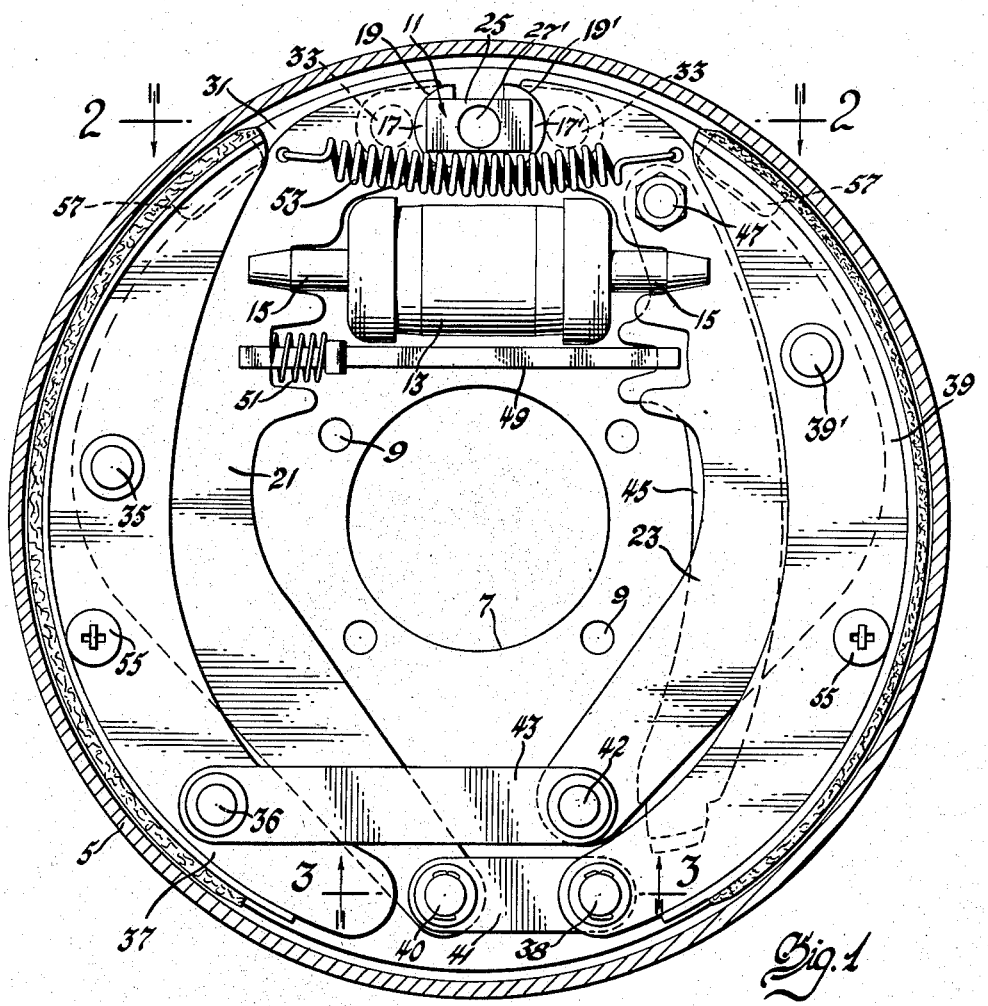
Fig. 1 is a vertical section through the drum.
Figures 2, 3:
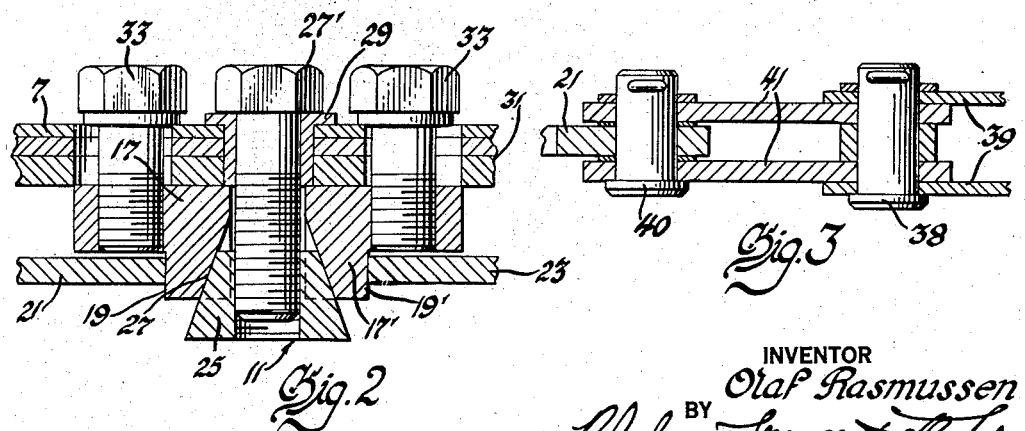
Fig. 2 is a section as indicated on Fig. 1 by line 2—2.

Similarly, lines 3—3 on Fig. 1 show the plane of the other sectional view, Fig. 3.

Referring by reference characters to the several figures, a conventional drum is identified by numeral 5. A cover plate 7 is fastened as usual to the rigid axle, not shown, by fastening means extending through openings 9. This cover plate carries a shoe anchor represented as a whole by numeral 11 and an applying means in the form of the conventional wheel cylinder 13 of a hydraulic brake applying system. From opposite ends of the wheel cylinder extend piston rods 15 to engage the braking members. The brake anchor takes the form of a pair of abutment members 17, 17'. They have shoulders 19, 19' to engage the adjacent ends of levers 21, 23. A wedge 25 fits angular faces 27 on the abutments. Into the wedge is threaded an adjusting bolt 27' extending through a sleeve 29, and through the cover plate 7 and the reinforcing plates 31. Rotation of the bolt 27' reciprocates the wedge and spreads apart the abutments 17, 17' to take up for brake shoe wear. On either side of the adjusting nut 27' are securing bolts 33 extending through slots in the cover plate 7 and the reinforcing plates 31 and threaded into the abutments to hold the latter in adjusted position relative to the cover plate 7.

The levers 21 and 23 are not brake shoes. They carry the brake shoes. At an intermediate point 35 of lever 21 is pivoted a brake shoe 37 at an intermediate point of the latter. In a similar manner a pivot pin 39' connects intermediate points of lever 23 and shoe 39. Link means 41 connect the lower end of lever 21 at 40 to the lower end of shoe 39 at 38. Link means 43 connect the lower end of lever 23 at 42 to a point 36 near the lower end of shoe 37.

Provision is made for applying the brake by hand. A manually operable lever 45 is pivoted at 47 to the upper end of lever 23. A strut 49 engages an intermediate point of lever 45 and extends to and engages lever 21. To hold the parts of the manually operable device engaged when the brake is applied hydraulically there may be used a spring 51 in the relation shown. A spring 53 is terminally connected to levers 21 and 23 beneath the anchor to bias the brake assembly to its released position. Conventional steady rests are shown at 55 to hold the shoes toward the cover and away from the drum. Guiding means marked 57 may also be provided on the cover plate near the ends of the shoes.

In applying the brake by hydraulic means, fluid medium within the wheel cylinder 13 forces outwardly the rods 15. If it be assumed that the drum is rotating counterclockwise, lever 21 first rotates about its pivotal connection 40 with link means 41 thus carrying shoe 37 into contact with the drum. Thereupon both lever 21 and shoe 37 travel with the drum and the links 41 and 43 force lever 23 and shoe 39 toward the drum and shoe 39 into drum contact. Lever 23 anchors on its abutment 17' and thus both shoes cooperate in resisting drum rotation. Should the drum be rotating clockwise, the action is reversed and both shoes resist drum rotation, lever 21 being anchored on its abutment 17. The same brake action may be effected by the emergency lever acting through the instrumentality of lever 45. In general the emergency application will be used only on the brakes of the rear wheels while the service application by means of the hydraulic cylinders will be made available for all wheels, front and rear.

When the brake is released the releasing spring 53 holds the levers on the abutments 17 and 17' and also pulls the levers so that the pistons 15 are in their inner stopped position. Under these circumstances the lower end of each lever functions through its link means to push the lower end of the shoe associated with the other lever to an outer limit position short of contact with the drum. Obviously since the action is positive and limited the upper ends of the shoes are swung inwardly away from the drum to a predetermined extent.

When the levers 21 and 23 are spread apart by the adjusting means at 25 the pivoted connections 35 and 39' between the shoes and levers are moved outwardly so as to bring the midpoints of the shoes nearer the drum, but since the lower ends of levers remain substantially unchanged the link means 41 and 43 serve as before to swing the shoes about their pivots with the levers to a predetermined extent and prevent any dragging of either end of the shoes.

I claim:

1. In a brake, a drum, a pair of associated levers floating within said drum, means to spread said levers, anchor means between one pair of adjacent ends of said levers, a shoe pivoted at an intermediate point thereof to an intermediate point of each of said levers and link means connecting the other end of each lever to an adjacent end of the shoe carried by the associated lever.

2. The invention defined by claim 1, said anchor means being adjustable whereby the pivots between the shoes and levers are movable toward and from the drum.

3. The invention defined by claim 1, together with yielding means to effect engagement of both levers with the anchor means and to effect the release position of spreading means whereby the link means functions to prevent dragging of the shoes.

4. In a brake, a drum having an internal circular friction surface, first and second associated levers positioned within said friction surface, anchor means between a first pair of adjacent ends of said levers, a shoe pivoted at an intermediate point thereof to an intermediate point of each of said levers, means to spread said levers radially within said anchor means, the ends of said shoes adjacent said spreading means being unattached, link means connecting the other end of each lever to an adjacent end of the shoe carried by the associated lever, together with yielding means operable to hold said levers against the anchor means.

5. The invention defined by claim 4, said anchor means comprising spaced abutments one for each lever and adjustable wedging means between said abutments.

OLAF RASMUSSEN.